Dec. 27, 1966 C. W. HOGLUND ETAL 3,293,739
METHOD OF HOLDING DEFORMABLE OBJECTS
Original Filed Sept. 25, 1959 10 Sheets-Sheet 1
FIG. 1
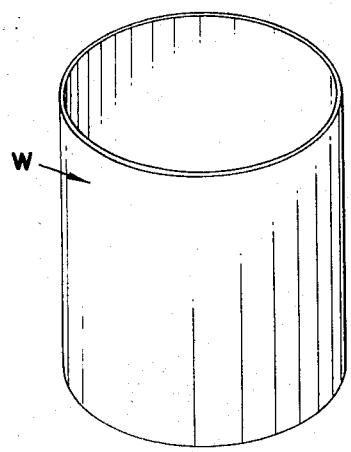
FIG. 2
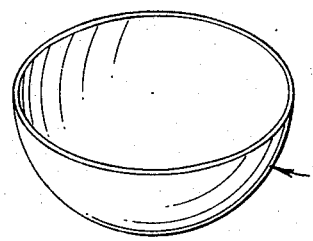
FIG. 3
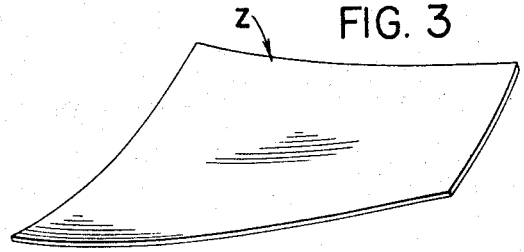
FIG. 7
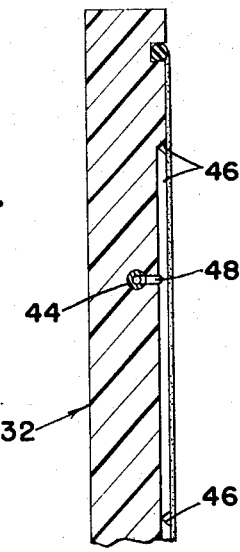
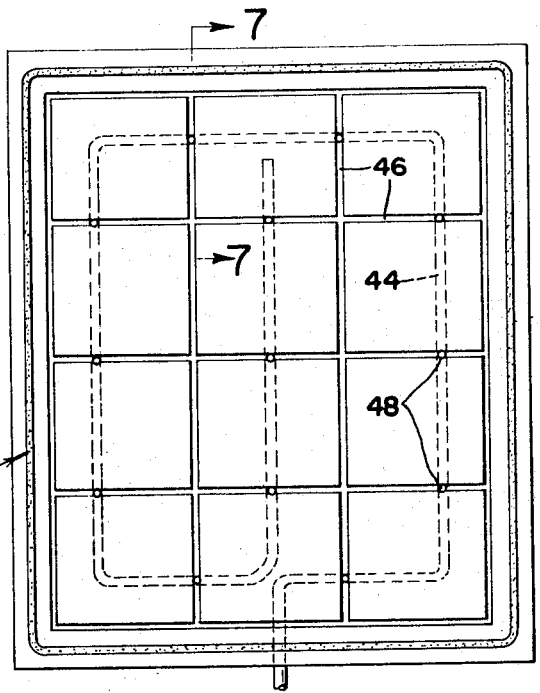
FIG. 6
FIG. 10
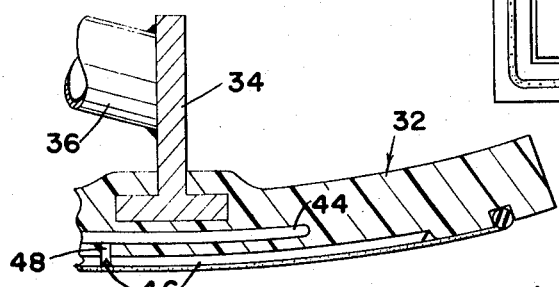
INVENTORS.
CARL W. HOGLUND &
ARTHUR G. COY
BY
Williams, Tilbury & Gobrick
ATTORNEYS

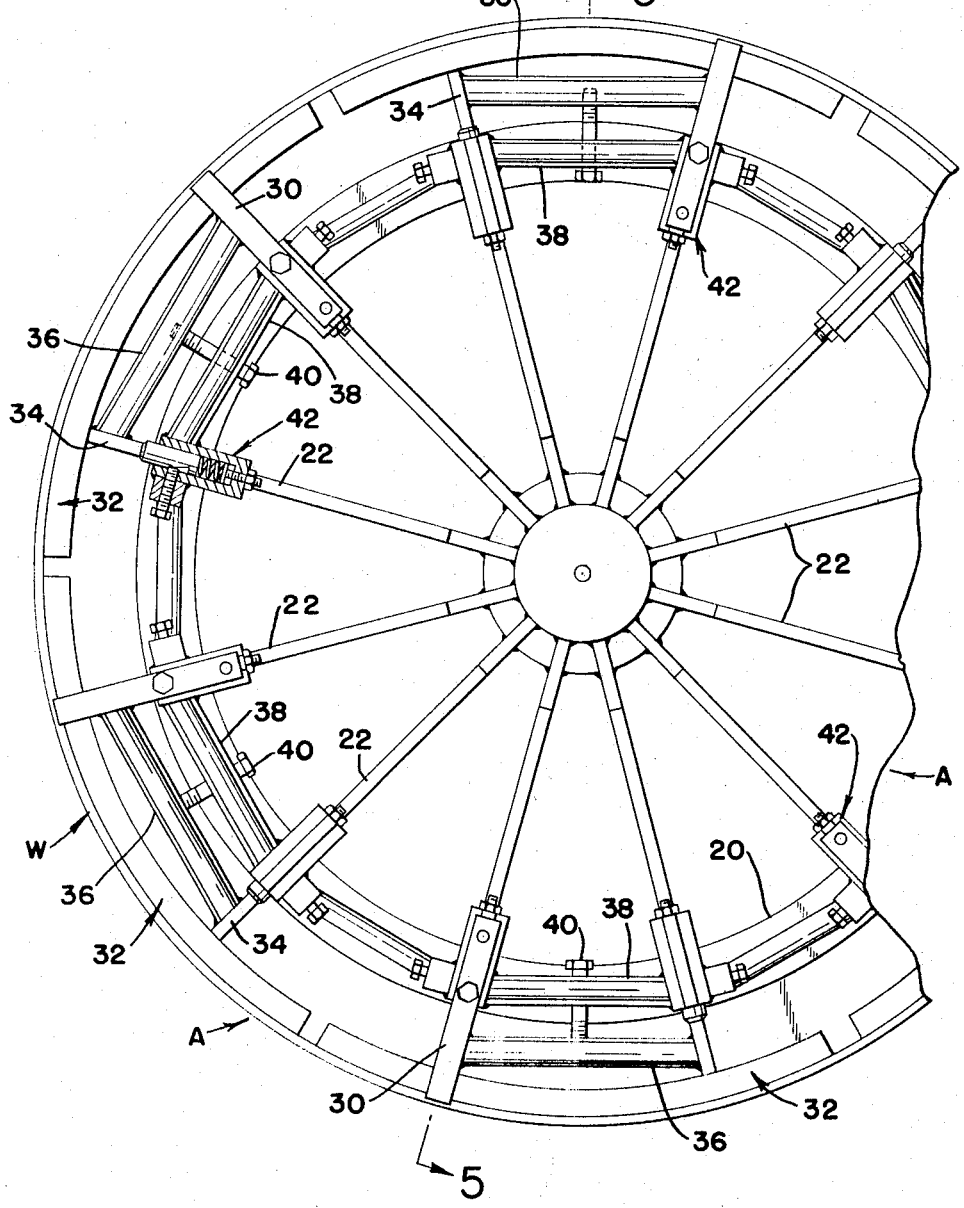

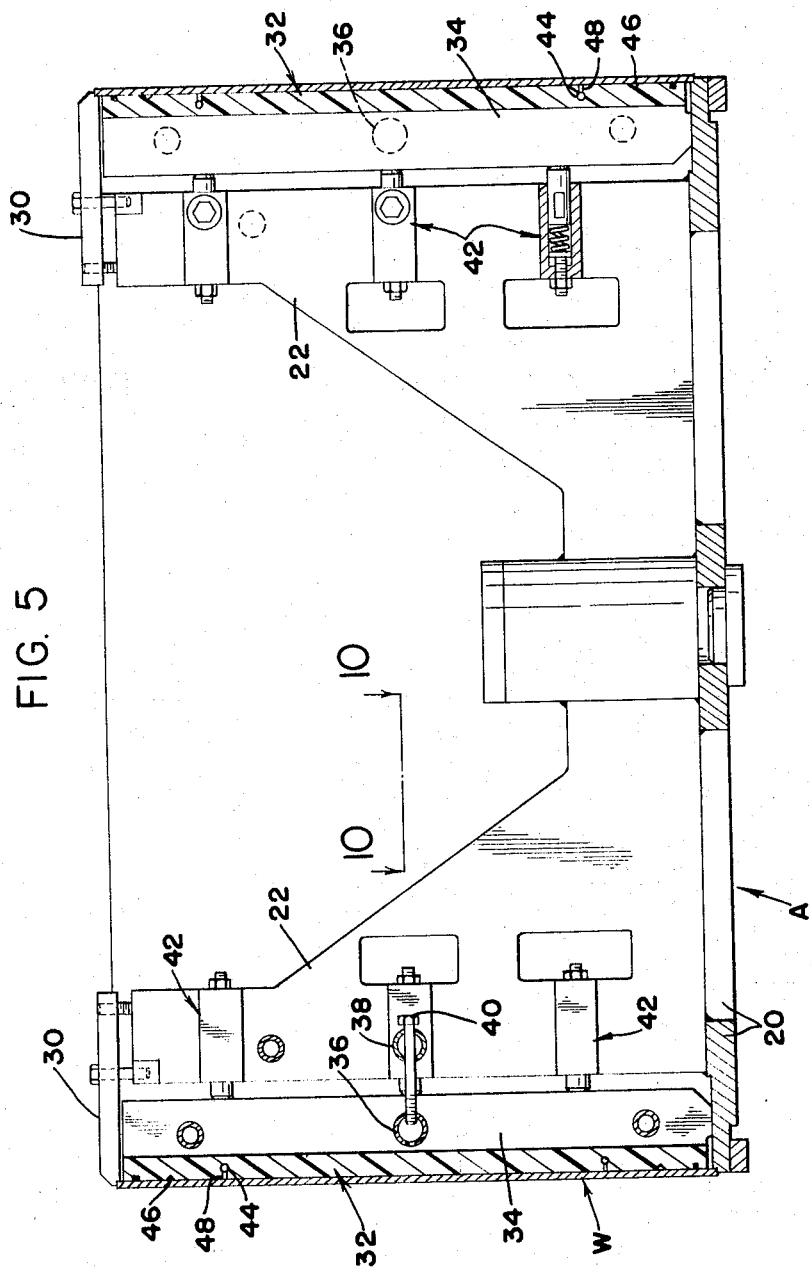

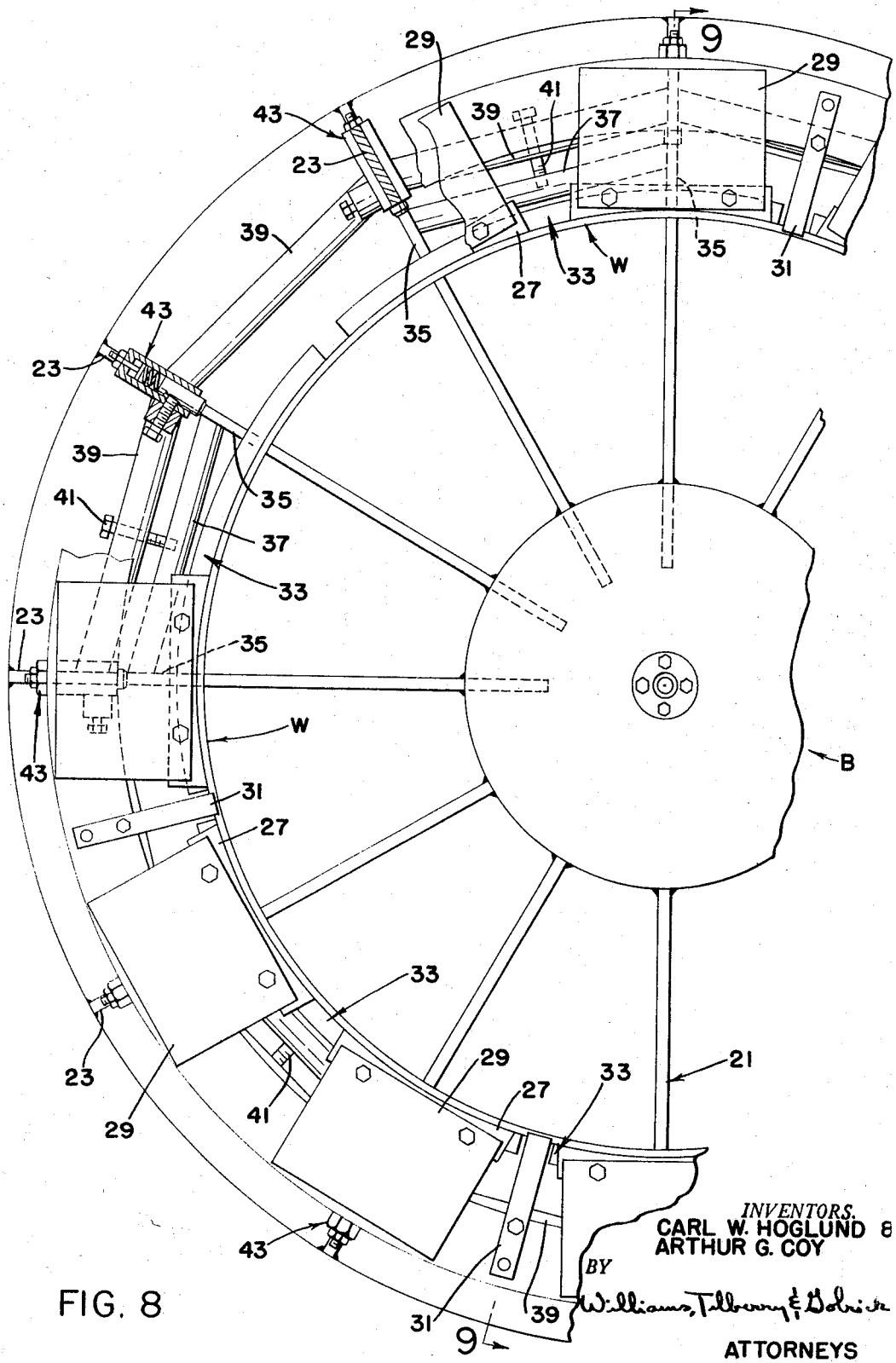

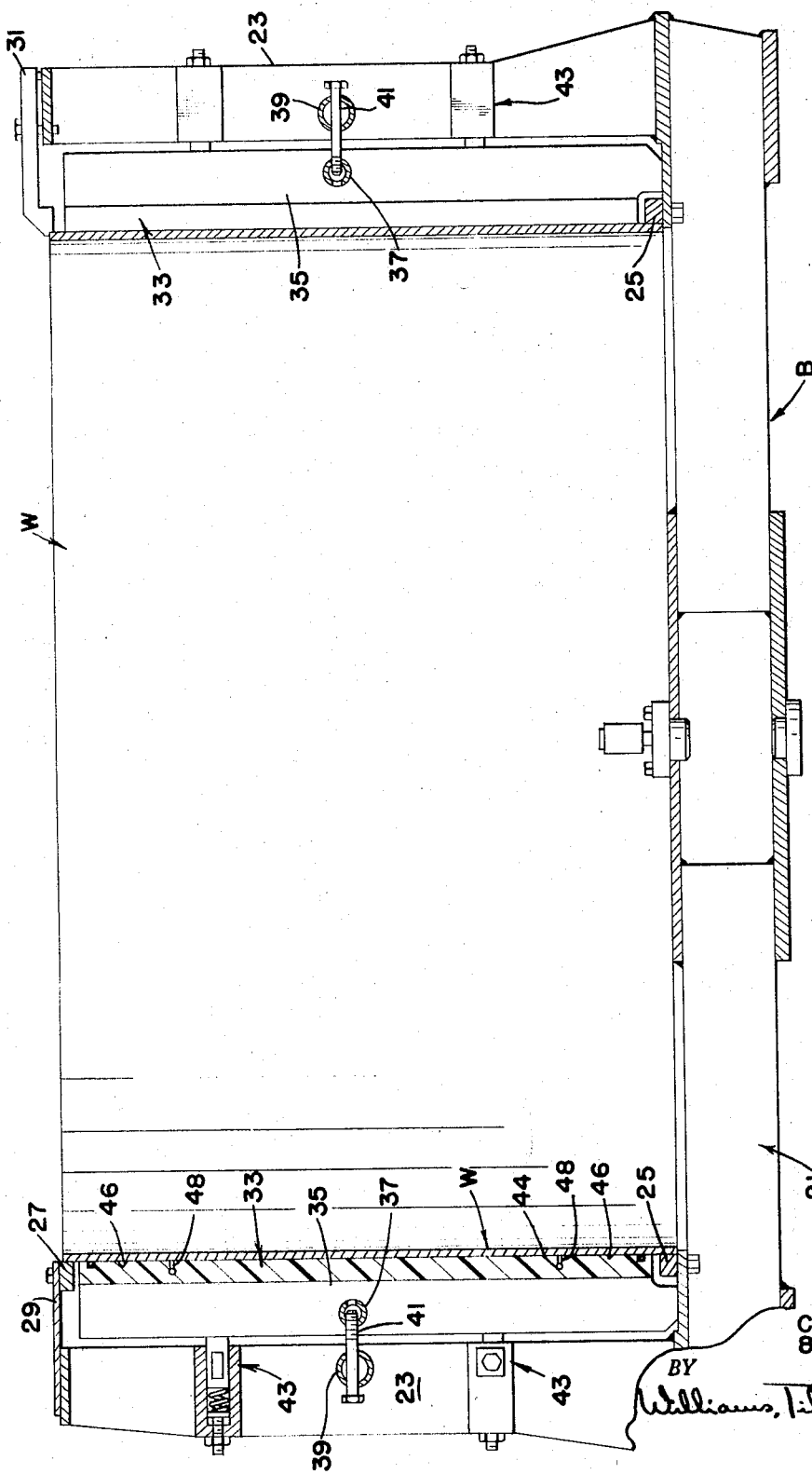

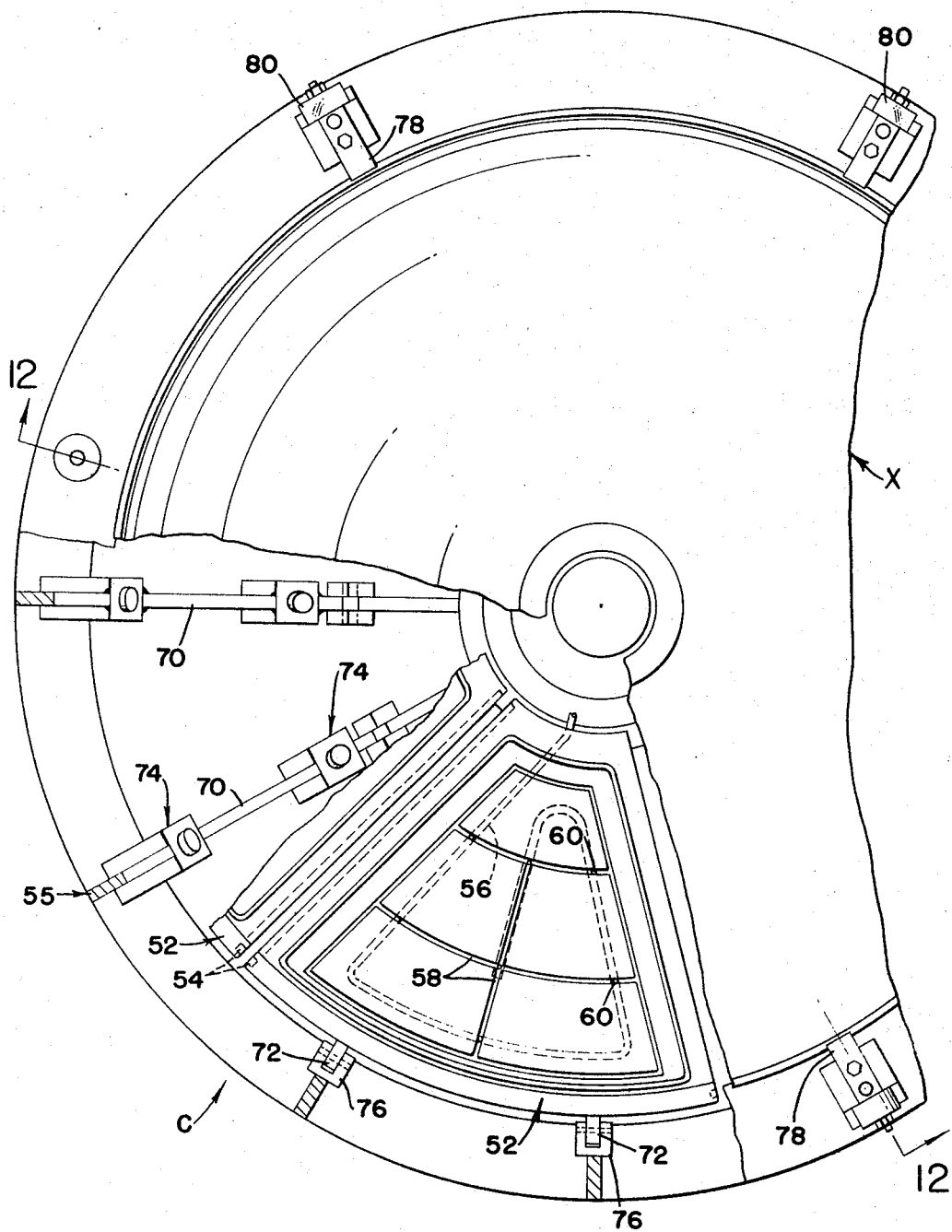

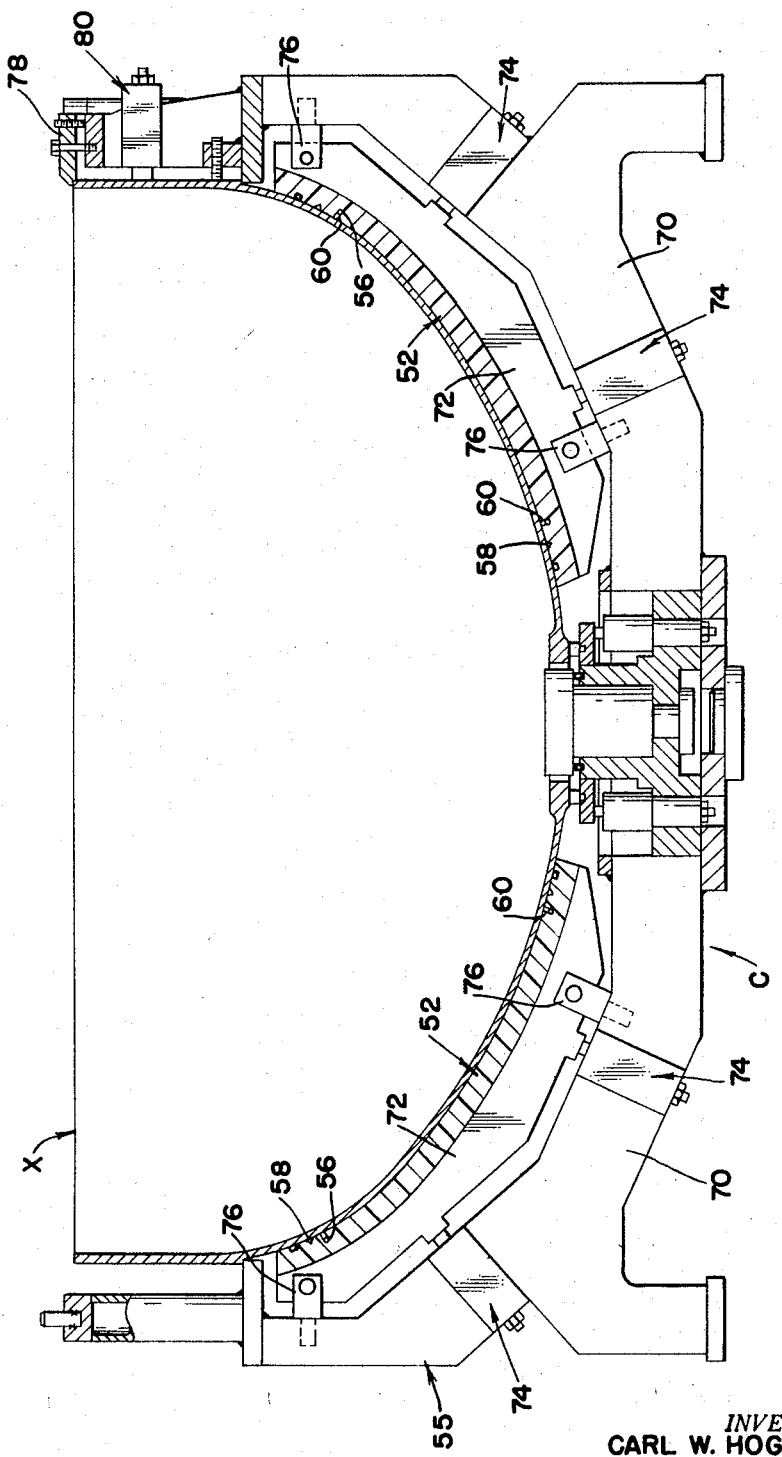

Dec. 27, 1966   C. W. HOGLUND ETAL   3,293,739
METHOD OF HOLDING DEFORMABLE OBJECTS
Original Filed Sept. 25, 1959   10 Sheets-Sheet 9

INVENTORS.
CARL W. HOGLUND &
ARTHUR G. COY
BY
Williams, Tilbury & Gohrick
ATTORNEYS Dec. 27, 1966  C. W. HOGLUND ETAL  3,293,739
METHOD OF HOLDING DEFORMABLE OBJECTS
Original Filed Sept. 25, 1959  10 Sheets-Sheet 10
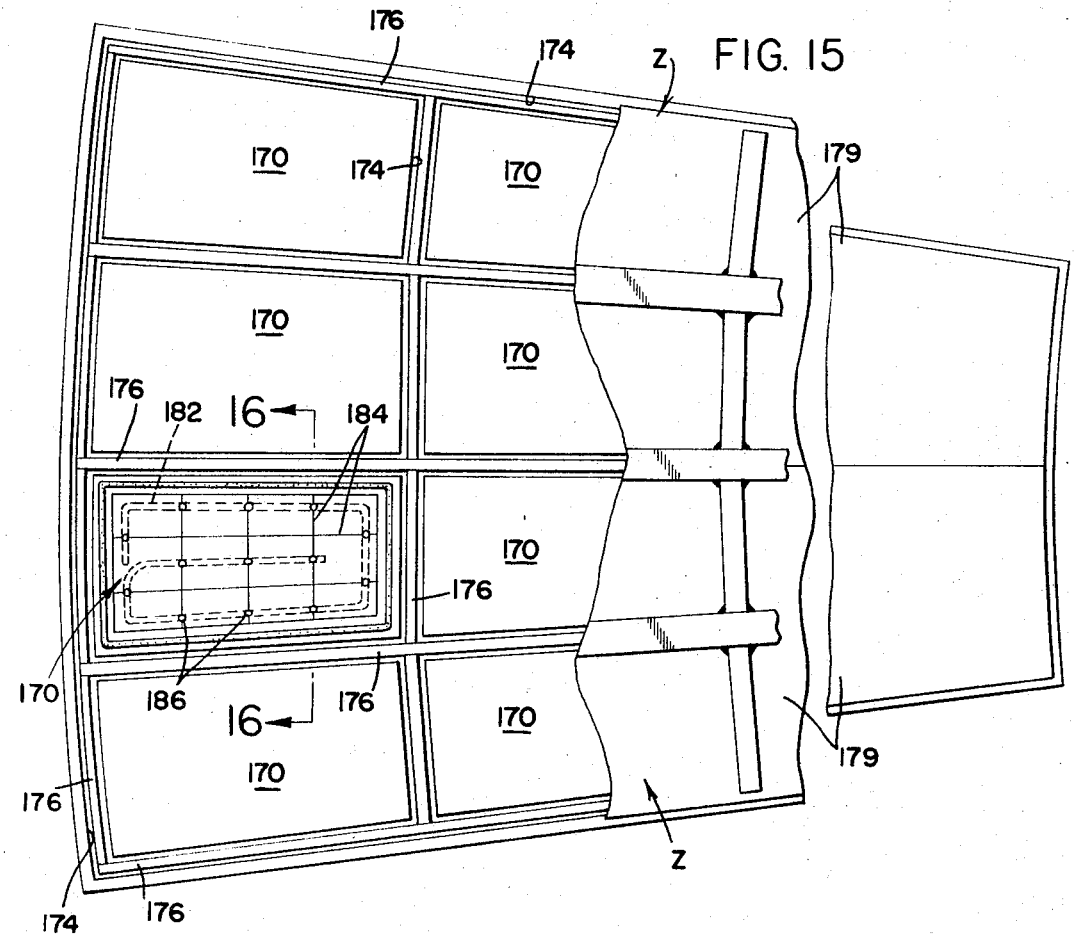
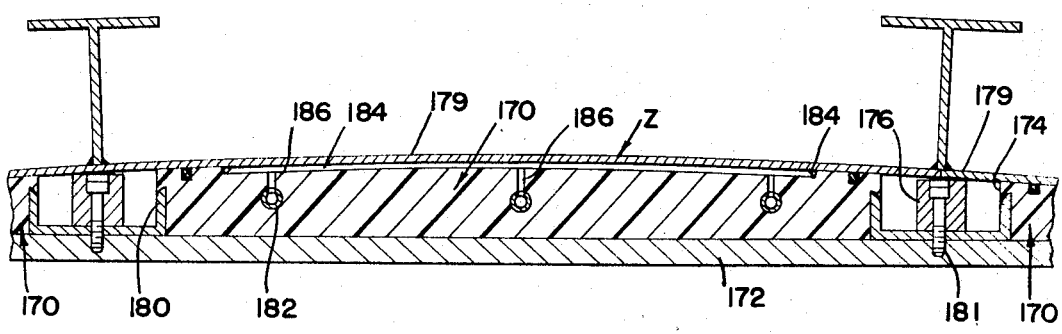
INVENTORS.
CARL W. HOGLUND &
ARTHUR G. COY
BY Williams, Tilbury & Dobrick
ATTORNEYS United States Patent Office 3,293,739
Patented Dec. 27, 1966

3,293,739
METHOD OF HOLDING DEFORMABLE OBJECTS
Carl W. Hoglund, Toledo, and Arthur G. Coy, Salem, Ohio, assignors to E. W. Bliss Company, Canton, Ohio, a corporation of Delaware
Continuation of application Ser. No. 842,442, Sept. 25, 1959. This application Jan. 28, 1965, Ser. No. 431,759
8 Claims. (Cl. 29—471.1)

This application is a continuation of co-pending application, Serial No. 842,442, filed September 25, 1959, now abandoned.

This invention relates to the problem of performing work on a thin-walled metal workpiece whose weight is small in comparison to its size tending to make it dimensionally unstable under its own weight and pressure if unsupported.

More particularly, this invention relates to the problem of supporting large thin-walled metal workpieces such as cylinders, hemispheres, cones and other curvilinear surfaces which are difficult, if not impossible, to hold with standard work-holding fixtures. The class of goods under consideration includes: metal workpieces which are too large to chuck, grip, or clamp with standard machine tool devices; workpieces which are not amenable to standard clamping or holding means because of deformation to the workpiece caused by pressure applied by these standard workholding devices; workpieces which must be finished to the same specifications on opposite and/or all surfaces; and, workpieces of irregular or non-standard shape which are impossible to satisfactorily clamp by conventional means.

Several classes of work are contemplated as subjects for the present invention. For instance, thin sheets of metal which, in their final fabricated condition, assume a geometrical shape such as generated by a parabolic curve or the like, but which if unsupported will not retain its shape. Another class of goods includes thin-walled cylindrical members which must be held firmly in round while work is being performed thereon, and which normally would be forced into elliptical configurations when radially directed pressures are applied to their surfaces. The same problem applies to hemispherical shapes which must be maintained within strict spherical tolerances, as well as many other curvilinear surfaces, all of which have the common denominator comprising thin-walled nonform sustaining sections subject to deformation if not otherwise supported adequately for machining, welding, or other work performing operations.

It is the purpose of this application, therefore, to teach a method of supporting workpieces as above-described by means of vacuum gripping between the workpiece and a supporting member. We are aware that in the prior art there are various devices which fall in the general category of air chucks or vacuum holding means, but these devices for the most part relate to production work wherein relatively small workpieces of conventional shape are held by vacuum means to a surface of a chuck. Flat plates and small cylinders mounted on mandrels are the usual embodiments of these work-holding devices. However, we have in mind dimensionally unstable objects which are entirely too large, too lightweight, and too unorthodox in size, configuration, and wall thickness to be handled by any of the vacuum holding apparatus known to us in the prior art.

It is, therefore, an object of this invention to provide a method of holding difficult to chuck workpieces of the type described whereby rigid tolerances may be maintained in machining operations, welding operations, or other work performing operations; to provide a means of holding a workpiece to a prescribed contour and to resist movement of the workpiece due to the forces encountered in processing such as welding, machining, and the like; to provide a quick and economical manner of changing the contour of a fixture to cope with design changes, or to correct for the stresses induced in the workpiece which cannot be accurately determined beforehand; to provide a means of ameliorating localized deformation of a workpiece due to heat of welding, and deformation caused by weight and pressure of the workpiece as well as that of a tool; to provide a method of controlling and/or removing heat induced by a welding or cutting process; and to provide a custom-made fixture, the shape of which is that to which the workpiece must be formed or must conform.

To the accomplishment of the foregoing and related objects, said invention then consists of means hereinafter fully described and particularly pointed out in the claims, the annexed drawings, and the foregoing description.

Reference is now made to the drawings in which:

FIGURES 1, 2, and 3 are illustrative of curvilinear surfaces of the type which the subject invention proposes to hold without deformation while work is being performed thereon;

FIGURE 4 is a fragmentary plan view of an embodiment of the invention adapted to hold the thin-walled cylinder of FIGURE 1 while work is being performed on its exterior surface;

FIGURE 5 is a section taken on the line 5—5 of FIGURE 4;

FIGURE 6 is an elevational view of a work-holding pad, a portion of the embodiment of the invention shown in FIGURES 4 and 5;

FIGURE 7 is an enlarged fragmentary sectional view taken on the line 7—7 of FIGURE 6;

FIGURE 8 is a plan view of an embodiment of the invention similar to that shown in FIGURE 4, but with the workpiece being supported on its exterior surface;

FIGURE 9 is a sectional view taken along line 9—9 of FIGURE 8;

FIGURE 10 is an enlarged fragmentary sectional view taken substantially along the line 10–10 of FIGURE 5;

FIGURE 11 is a fragmentary plan view of an embodiment of the invention wherein the curvilinear surface of FIGURE 2 is supported adjacent its exterior surface for work performing operations on its interior surface;

FIGURE 12 is a sectional view taken along line 12—12 of FIGURE 11;

FIGURE 15 is a plan view of yet another embodiment of the invention adapted to support curvilinear surfaces such as shown in FIGURE 3; and, FIGURE 16 is a section taken on the line 16—16 of FIGURE 15.

Figure 13:
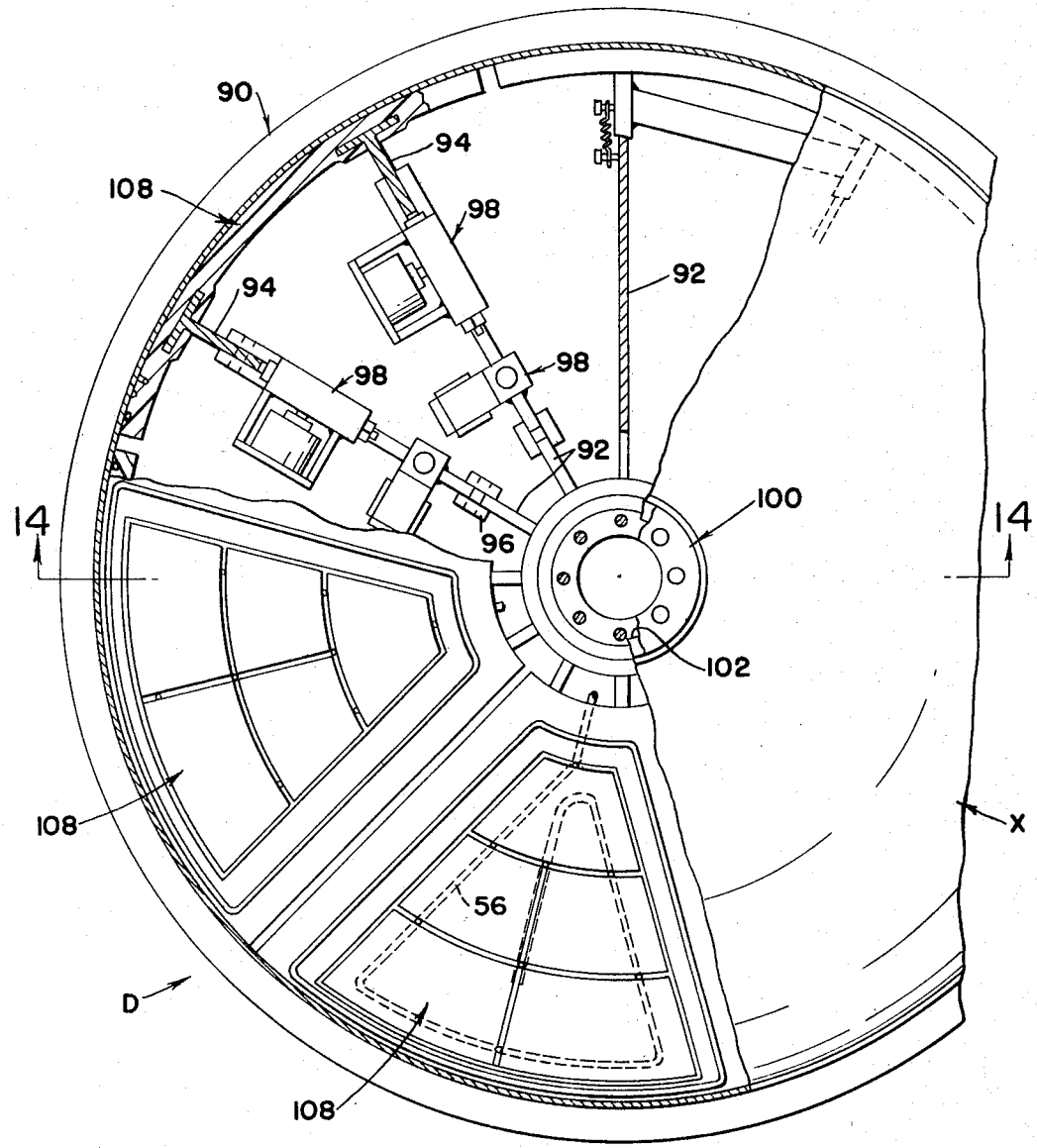
FIGURE 13 is a fragmentary plan view of an embodiment of the invention wherein the interior surface of the curvilinear member shown in FIGURE 2 is supported for work performing operations on its exterior surface.

Reference will now be made to the figures in greater detail and in particular to FIGURES 4 and 5. The work-holding fixture A for a thin-walled cylindrical object such as shown in FIGURE 1 comprises a circular base 20, and a plurality of vertically positioned ribs 22 evenly spaced about the periphery of the base. A plurality of hold-down clamps 30 are fastened to the ribs 22 to assist in holding the workpiece on the fixture A.

A plurality of pads 32, molded to the desired contour of the interior surface of the workpiece W, are concentrically arranged about the axis of the fixture A for radial adjustment to and from the interior surface of the workpiece W. The pads are preferably molded from epoxy resin to the exact required surface of the workpiece. That is, the pads are molded to the configuration of a master pattern corresponding to the desired final shape of the workpiece rather than to the configuration of the workpiece which is nonform sustaining by itself. The pads have molded integral therewith a pair of web members 34 which support a cross-member 36 (see FIGURE 10), illustrated as a tubular element. The pair of webs 34 are radially aligned with a corresponding pair of ribs 22 which in turn support a cross-member 38, also of tubular construction. A bolt 40 passes freely through the tubular member 38 for threaded engagement with the tubular member 36 to provide means for withdrawing the work-holding pad 32 from the workpiece W. Also mounted on each rib 22 are several spring-loaded jack members 42 adapted to hold the pads 32 in pressure contact with the workpiece W when the bolt 40 is backed off to permit radial movement of the pad outwardly.

The epoxy resin pad 32 is formed to the desired contour of the workpiece by making a plaster mold from templates or from a master mold. Epoxy resin is then poured in the plaster mold until it is hardened. At the time the mold is cast, vacuum lines 44 are embedded in the resin (see FIGURES 6 and 7) as will be discussed more fully hereinafter. When the pad is removed from the mold, the work contacting face of the pad is scored with a plurality of evenly distributed channels 46, all of which are connected to the embedded vacuum tube by connecting holes 48. The usual method of connecting the channels to the tube is by drilling holes in each channel through to the underlying vacuum tube, which is easily done because of the semi-transparency of the epoxy resin.

In addition to deformation due to working, the workpiece is sometimes out of round before it is placed in the fixture due to its dimensional instability. Accordingly, the work-holding pads 32 may be individually radially adjusted to bring the workpiece W back into round. The vacuum tube 44 of each pad 32 is connected to vacuum means, and by releasing or backing off the bolt 40, the spring-biased clamps 42 urge each pad into pressure contact with the workpiece W. Air is then evacuated from between the workpiece W and the supporting pad 32 to securely hold and support the workpiece in position.

Reference is now made to FIGURES 8 and 9 which illustrate the construction of a second work-holding fixture B adapted to hold the workpiece W while the interior surface is being finished. As will be noted, fixture B comprises substantially a reversal of the parts of fixture A so as to accomplish exterior clamping of the workpiece W. Thus, the fixture includes a circular base 21, and a plurality of vertically positioned ribs 23 evenly spaced about the periphery of the base. Workpiece positioning blocks 25 are fastened to the top surface of the base by threaded fasteners or the like, and are radially adjustable. Positioning blocks 27 are secured to the top surface of the ribs 23 by means of plate members 29 fastened thereto, and a plurality of hold-down clamps 31 are also fastened to the ribs 23 to assist in holding the workpiece on the fixture B.

A plurality of pads 33, molded to the desired contour of the exterior surface of the workpiece W, are concentrically arranged about the axis of the fixture B for radial adjustment to and from the exterior surface of the workpiece W. Pads 33 have molded integral therewith a pair of web members 35 which support a tubular cross-member 37. The pair of webs 35 are radially aligned with a corresponding pair of ribs 23 which in turn support a tubular cross member 39. A bolt 41 passes freely through tubular member 39 for threaded engagement with the tubular member 37 to provide means for withdrawing the work-holding pad 33 from the workpiece W. Also mounted on each rib 23 is a pair of spring-loaded clamp members 43 adapted to hold the pad 33 in pressure contact with the workpiece W when the bolt 41 is backed off to permit radial movement of the pad inwardly.

The sequence of operations for utilization of fixtures A and B is as follows.

A cylindrical workpiece W is placed in fixture A and vacuum held therein while the exterior surface and top end are rough finished. The workpiece is then turned end for end and placed in fixture B where the interior surface and the other end are rough finished and then final finished. The workpiece W is then returned to a fixture similar in all respects to fixture A, except for pad contour, to final finish the exterior surface and one end.

In the application of either fixture A or B, if from experience it is known that unrelieved stresses will tend to cause warping after the supporting pads are backed away from the workpiece W, a reverse or compensating distortion can be applied to the workpiece prior to working so that upon release of the pads, the workpiece will hold or assume its intended shape.

Consideration will now be given to curvilinear surfaces generally indicated in FIGURES 2 and 3, but not necessarily restricted thereto. A work supporting pad (see FIGURE 11) is molded to the desired shape of the workpiece, but with filler blocks 54 such as wood placed in the mold so as to enable the pad to be cut, for instance, into six sectors such as shown or any other suitable number of sectors. Thereafter, each section is mounted on a fixture U frame 55 for adjustment to and from the workpiece.

The frame 55 comprises a plurality of radially aligned ribs 70 arranged to support and adjust corresponding web members 72 by means of spring-loaded adjusting mechanisms 74, and clevis means 76, the lower of which is fixed in permanent position, and the upper one is free to float to provide pivotal movement about the said lower one. Each pad sector 52 is secured to a pair of web members 72, and the workpiece shell X is held in place by hold-down clamps 78 and side wall clamps 80.

Each sector 52 is provided with a vacuum tube 56 embedded therein and channels 58 in communication with the vacuum line by means of holes 60 so as to evacuate air between the workpiece and each segment. Similar to the problem encountered with a cylinder, a hemisphere, a cone, or any other surface generated by keeping a line in contact with a closed plane curve and with the other end of the generatrix passing through a fixed point not in the plane, the workpiece may be distorted prior to the operation due to its nonform sustaining character so that adjustment may be made to each individual pad in order to bring the workpiece back into shape.

Figure 14:
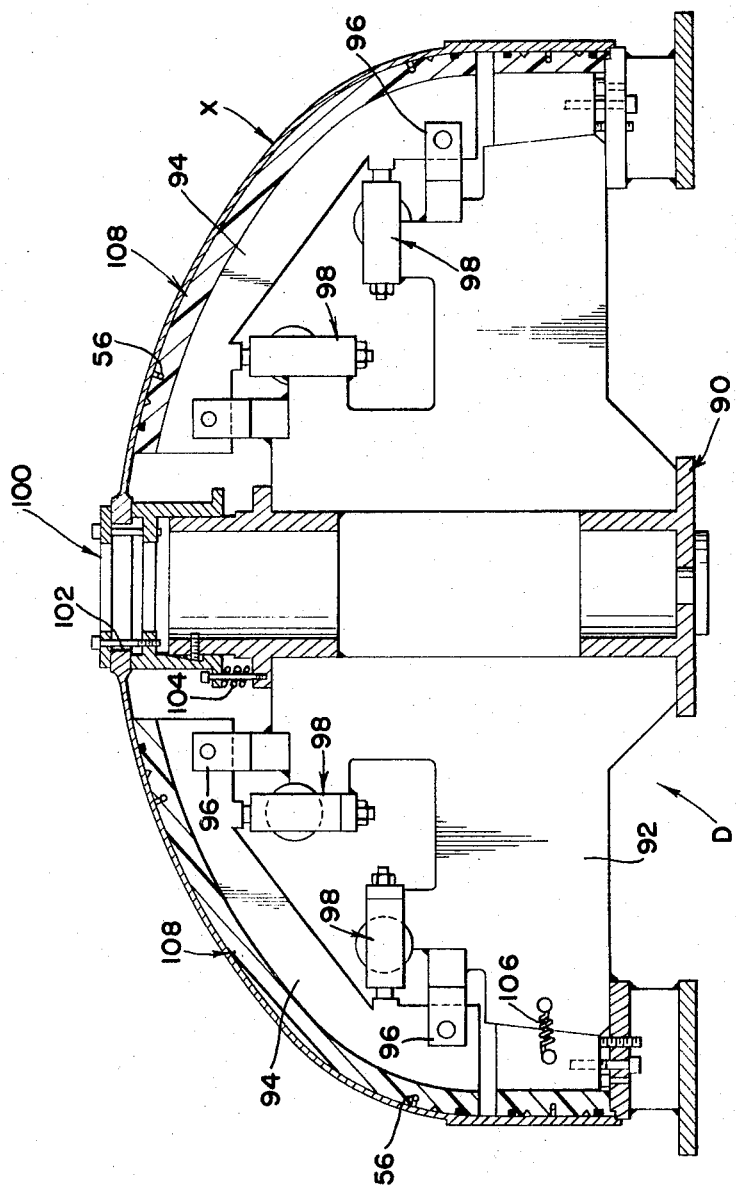
FIGURE 14 is a sectional view taken along line 14—14 of FIGURE 13.

Fixture D (see FIGURES 13 and 14) is a reversal of fixture C (FIGURES 11 and 12) and is designed to hold workpiece X for machining its outside surface. Thus, the frame 90 is essentially comprised of a plurality of radially aligned ribs 92 to which are fastened a corresponding number of webs 94 by clevis means 96, and holding and adjusting means 98. A hold-down fixture 100 is secured to the aperture 102 of the workpiece X and resiliently anchored to ribs 92 by bolt and coil spring means 104. The lower segmented pads 105 are held in contact with ribs 92 by means of spring 106. Adjustment of the pads 105 is obtained by co-action between plain screw 107 and cap screw 109. The construction of pad sectors 108 is similar to pad sectors 52.

In application, a workpiece shell X is placed and secured in first fixture C for rough machining the interior surface. It is then removed and placed in second fixture D whereupon the outside surface of the workpiece is rough machined as well as the nose aperture 102. The workpiece is next removed to a third fixture C for finish machining the inside diameter. Finally, the workpiece is removed to a fourth fixture D for final finishing the outside surface and the nose aperture. It is to be understood, of course, that only two fixtures, i.e., C and D, may be employed, but that for production machining utilization of two C fixtures and two D fixtures is more efficient.

Yet another application of the invention relates to the working of curvilinear surfaces such as FIGURE 3 wherein it is desirable to eliminate operations such as stretch-forming to a contour, or where it is impractical or impossible to resort to stretch-forming operations. An illustrative application relates to the fabrication of a curvilinear surface held to close tolerances which is larger than any single sheet available for fabrication. The desired shape, therefore, is defined by a work-holding pad contoured to reflect that ideal shape of the workpiece.

The pad portions 170 (see FIGURE 15) may be supported on a separate common base 172 (see FIGURE 16), or all of the pad portions may be molded as one integral unit in common with the base. Each pad portion 170 is separated from every other pad by channels 174. The channels 174 are provided to contain heat transfer bars 176, which are held in place by means of threaded fasteners 181, and channel members 180 embedded in the pads. The pads are also provided with vacuum lines 182 and channels 184 connected to the vacuum line by holes 186 as similarly described hereinabove. The vacuum line of each pad portion with respect to embodiments A, B, C, and D is individually connected to a source of vacuum. Thus, when a workpiece Z is in contact with a plurality of pads 170, the air therebetween may be evacuated in a selected and predetermined manner. Otherwise stated, when a plurality of pad portions are cooperating to hold a plurality of workpiece plates in position for welding, for instance, it is sometimes necessary to secure the positioned plates in a predetermined time sequence. By separately connecting each pad portion 170 to a source of vacuum, this control is thereby provided. After the heat transfer and adjusting bars 176 are properly positioned, plate segments 179 are placed on corresponding pads so as to partially overlap each adjacent heat transfer and adjusting bar 176 in abutting contact with its adjacent plate segment. Thereafter, the abutting edges of adjacent plates are then welded over the supporting heat transfer bars 176 to make a single curved plate of the desired configuration.

In fabrications approximately thirty feet in length, for instance, it is not unexpected that the application of heat to the plurality of plate segments and supporting bars and angles will set up stresses which if unrelieved will cause the assembled workpiece Z to buckle, twist, or otherwise deform when released from the holding action of the holding pad 170. It is, therefore, a portion of the technique of this invention to adjust said heat transfer and adjusting bars 176 upwardly or downwardly as necessary to compensate for predetermined distortion in the workpiece. Thereafter, upon release from the workholding pad 170, the workpiece Z will assume the required configuration.

Although other fixtures are possible of application to our invention, other than those illustrated in the figures, the principal features of our invention provide both a method and apparatus for holding a workpiece which is so large as to be impossible of chucking by any standard machine shop techniques or fixtures. The invention is not only adaptable to holding workpieces to rigid tolerances, but is further adaptable to deliberately distorting workpieces so as to compensate for initial distortion, spring-back, or subsequent distortion caused by work performed thereon. The invention further contemplates and teaches a method wherein first one side of a workpiece is worked to a close tolerance and then the opposite side or surface of the workpiece is worked to a close tolerance, the workpiece itself having such thin walls as to be incapable of self-support, and being subject to deformation under its own weight as well as by the very act of performing work thereon. It is further contemplated, however, that changes and modifications may be made in the preferred form of the invention disclosed herein without departing from the spirit and scope of the invention as set forth in the appended claims.

We claim:
1. The method of supporting a large workpiece characterized in that it tends to be non-form sustaining under its own weight and pressure comprising the steps of
   molding a support surface to the configuration of a master pattern corresponding to the intended shape of said workpiece,
   engaging a surface of the workpiece with the support surface,
   conforming the workpiece to the shape of the support surface, and
   performing work on the workpiece while held in the conformed state.

2. The method as set forth in claim 1 wherein the conforming step includes evacuating between the workpiece and support surface.

3. The method of supporting a workpiece characterized in that it has a large surface area in relation to its thickness and tends to be non-form sustaining under its own weight and pressure comprising the steps of
   molding a plurality of support members which when assembled provide a substantially continuous support surface of the configuration of a master pattern corresponding to the intended shape of said workpiece,
   engaging a surface of the workpiece with said support surface,
   conforming the workpiece to the shape of the support surface, and
   performing work on the workpiece while held in the conformed state.

4. The method as set forth in claim 3 wherein the conforming step includes evacuating between each support member and the workpiece.

5. The method of supporting a plurality of workpiece sheets to form a single surface of larger total area than any one of said sheets each of which is so thin as to be non-form sustaining under its own weight and pressure comprising the steps of
   molding a plurality of support members which when assembled provide a substantially continuous support surface of the configuration of a master pattern corresponding to the intended shape of said surface,
   engaging each workpiece sheet with an assembled support member to construct the general outline of said surface,
   conforming the workpiece sheets to the shape of said support surface, and
   performing work on each workpiece sheet while held in the conformed state.

6. The method as set forth in claim 5 wherein each support member has a workpiece sheet positioned thereon and the conforming step includes evacuating between each workpiece sheet and the associated support member.

7. The method as set forth in claim 6 wherein each workpiece sheet is in substantial edge to edge contact when in the conformed state and comprising joining the edges of the workpiece sheets.

8. The method as set forth in claim 7 wherein the edges of adjacent workpiece sheets are between adjacent support members and are joined by welding, the method comprising in addition the steps of
   supporting the edges between adjacent workpiece sheets with a heat conducting member isolated from said support members, and
   conducting heat away from the welded seam during the welding operation.

References Cited by the Examiner

UNITED STATES PATENTS

| | | | |
|---|---|---|---|
| 1,109,659 | 9/1914 | Braden | 29—493 |
| 2,028,928 | 1/1936 | Sherts | 269—21 |
| 2,366,164 | 1/1945 | Weick et al. | 29—493 |
| 2,366,935 | 1/1945 | Schmid. | |
| 2,458,302 | 1/1949 | Richardson | 29—493 X |
| 2,729,040 | 1/1956 | Wallace et al. | 51—235 |
| 2,756,644 | 7/1956 | Steele | 269—21 |

CHARLIE T. MOON, *Primary Examiner.*